United States Patent
Nakayama

(10) Patent No.: US 10,434,665 B2
(45) Date of Patent: Oct. 8, 2019

(54) ROBOT INCLUDING TOOL HAVING SHOCK-ABSORBING MEMBER

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 171 days.

(21) Appl. No.: 15/602,511

(22) Filed: May 23, 2017

(65) Prior Publication Data

US 2017/0341239 A1    Nov. 30, 2017

(30) Foreign Application Priority Data

May 26, 2016    (JP) ................. 2016-105275

(51) Int. Cl.
| | | |
|---|---|---|
| *F16F 1/36* | (2006.01) | |
| *B25J 19/00* | (2006.01) | |
| *B25J 13/08* | (2006.01) | |
| *B25J 15/02* | (2006.01) | |

(52) U.S. Cl.
CPC ......... *B25J 19/0091* (2013.01); *B25J 13/085* (2013.01); *B25J 15/0253* (2013.01); *Y10S 901/46* (2013.01)

(58) Field of Classification Search
CPC ...... B23Q 7/04; B23Q 7/16; F16F 1/36; F16F 1/44; B25J 13/085; B25J 19/0091; B25J 15/08
USPC .............. 700/245; 173/120, 122, 210, 93.5; 414/225.01
See application file for complete search history.

(56) References Cited

U.S. PATENT DOCUMENTS

| | | | |
|---|---|---|---|
| 7,778,732 B2 | 8/2010 | Adachi et al. | |
| 9,317,032 B2* | 4/2016 | Finkemeyer | B25J 9/1628 |
| 2010/0139437 A1 | 6/2010 | Ichikawa et al. | |
| 2012/0163953 A1 | 6/2012 | Murano et al. | |
| 2014/0001888 A1* | 1/2014 | Frangen | H02H 5/12 |
| | | | 307/326 |
| 2014/0067121 A1* | 3/2014 | Brooks | B25J 9/1676 |
| | | | 700/255 |

FOREIGN PATENT DOCUMENTS

| | | |
|---|---|---|
| CN | 101039779 A | 9/2007 |
| CN | 102482040 A | 5/2012 |
| CN | 103386684 A | 11/2013 |
| CN | 203266675 U | 11/2013 |
| JP | S61033894 A | 2/1986 |
| JP | S63060591 U | 4/1988 |
| JP | H10249785 A | 9/1998 |

(Continued)

*Primary Examiner* — Dalena Tran
(74) *Attorney, Agent, or Firm* — RatnerPrestia

(57) ABSTRACT

A robot shares a work space with a person, to perform an operation. The robot includes a shock-absorbing member which covers the periphery of at least a base part of a working tool attached to an robot arm, a detector which is provided for the robot arm, to detect an external force input via the shock-absorbing member, and a robot control device which stops the robot when determining, based on information of the detected external force, that the working tool collides with the person. The external force is transmitted from the working tool to the robot arm, and is detected by the detector.

6 Claims, 4 Drawing Sheets

(56) References Cited

FOREIGN PATENT DOCUMENTS

| | | | |
|---|---|---|---|
| JP | 2006021287 | A | 1/2006 |
| JP | 2010125546 | A | 6/2010 |
| JP | 2012040666 | A | 3/2012 |
| JP | 2014-076524 | | 5/2014 |
| JP | 2015037826 | A | 2/2015 |
| JP | 5835276 | B | 12/2015 |
| JP | 5902664 | B | 4/2016 |

* cited by examiner

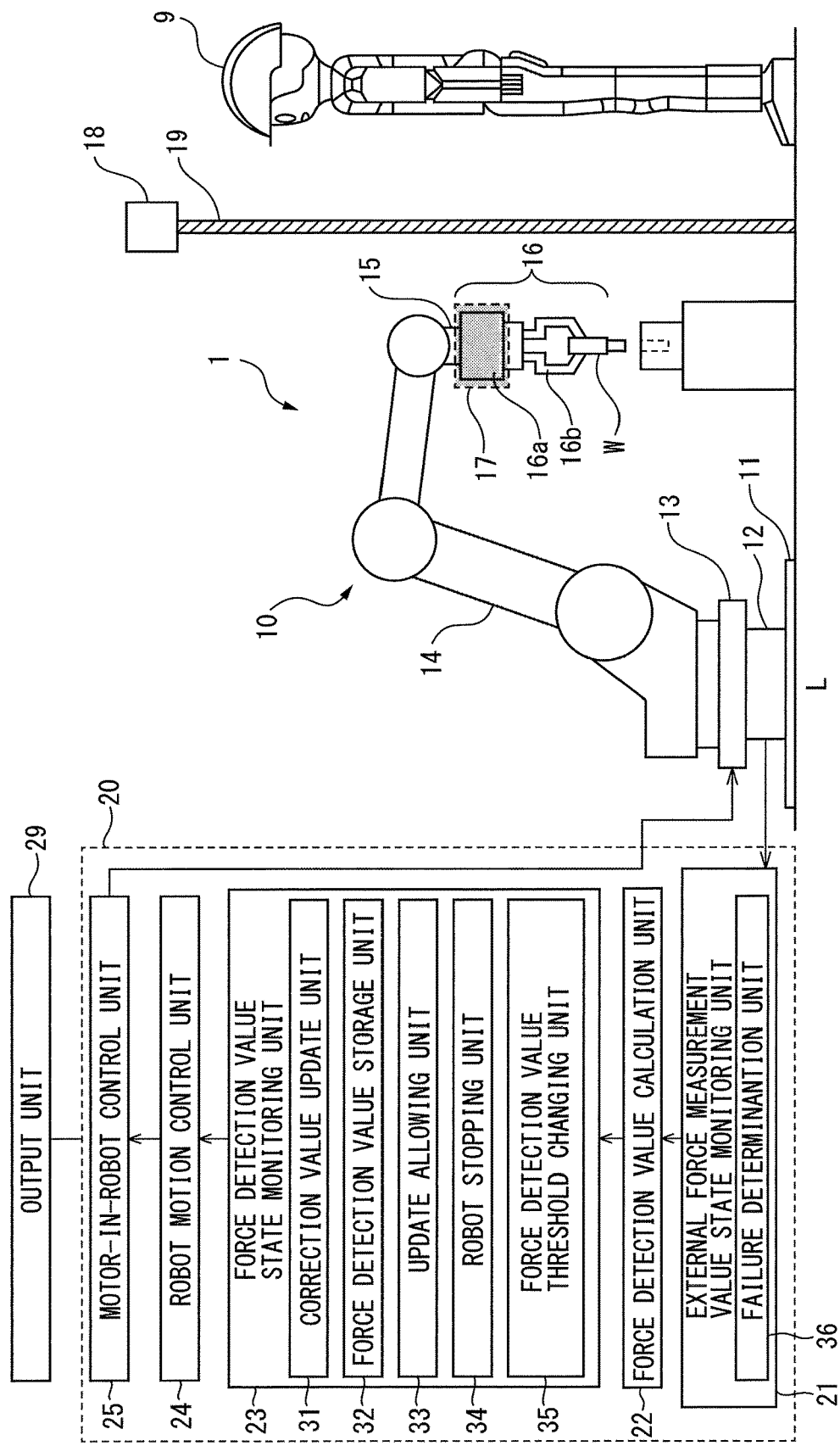

ROBOT INCLUDING TOOL HAVING SHOCK-ABSORBING MEMBER

BACKGROUND OF THE INVENTION

1. Field of the Invention

The present invention relates to a collaborative robot for performing an operation while sharing a work space.

2. Description of the Related Art

In industrial robots, in order to enhance the safety of a person, a safety fence is provided around the movable area of a robot, to restrict entry of the person to the movable area of the robot. However, in recent years, an industrial robot, in which some measure is used, in place of the safety fence, to sufficiently enhance the safety of a person, can perform an operation while sharing a work space with the person. This increases the demand for such a robot, so-called collaborative robot.

The use of a collaborative robot system enables a person and a robot to perform different operations within the same space, or enables a person to perform an operation for a workpiece gripped by a robot. However, when a collaborative robot is used, a person and a robot share a work space, and accordingly, it is necessary to prevent the person from colliding with the robot and being injured.

Especially, there is a high possibility that an operator performs an operation near a working tool attached to the wrist of a robot, and accordingly, it is necessary to prevent the operator from being injured even when the working tool collides with the operator.

For example, Japanese Patent No. 5835276 (hereinafter referred to as Patent Document 1), Japanese Unexamined Patent Publication (Kokai) No. 2014-76524 (hereinafter referred to as Patent Document 2), and Japanese Patent No. 5902664 (hereinafter referred to as Patent Document 3) disclose a structure for covering a part of a robot.

Patent Document 1 proposes a structure in which a robot hand is covered by a bag-like member. This proposal is to cause the robot hand to have cleaning performance and dust-proof and drip-proof performance for antibacterial protection, to utilize a robot in biomedical field.

Patent Document 2 proposes a robot in which fingers of a robot hand capable of gripping an object are covered by an elastically deformable member, to reliably grip the object.

Patent Document 3 proposes a collaborative robot in which a robot arm is covered by a protective member.

However, Patent Document 1, Patent Document 2, and Patent Document 3 do not disclose a technology intended to reduce a dangerous risk, which may occur when a working tool attached to a wrist of a robot collides with a person. In other words, a proposal to implement a countermeasure for the working tool itself, which reduces a dangerous risk at the time of collision between the working tool of the robot and the person, has not been conventionally made.

The bag-like member covering the robot hand disclosed in Patent Document 1 is not a member for absorbing a shock of collision with a person, and is a member for maintaining sanitation. The elastically deformable member for covering fingers of the robot hand disclosed in Patent Document 2 is a member for reliably gripping an object, but is not a member for absorbing a shock of collision with a person. Further, in the collaborative robot disclosed in Patent Document 3, the robot arm is merely covered by the protective member.

As described above, in the collaborative robot, there is a high possibility that the operator robot performs an operation near the working tool attached to the wrist of the robot. As the use of the collaborative robot expands, the importance of making a countermeasure for preventing collision in the working tool itself increases hereafter, in order to enhance the human safety. Further, the working tool attached to the frontmost end of the robot arm moves at a speed higher than the arm of the robot main body, and accordingly, probably become the greatest risk source when the robot moves.

SUMMARY OF THE INVENTION

The present invention provides a robot including a tool having a working tool attached to the robot and a shock-absorbing member capable of reducing a dangerous risk of collision with a person.

According to a first aspect of the disclosure, there is provided a robot that shares a work space with a person, to perform an operation, wherein the robot includes a robot arm to which a working tool is attached, the working tool having a base part and a movable part provided in the base part. The robot includes a shock-absorbing member which covers the periphery of at least the base part of the working tool and which is made of a material having a rigidity lower than that of the base part and the movable part of the working tool, a detector which is provided for the robot arm, to detect an external force input via the shock-absorbing member, and a robot control device which determines, based on information of the external force detected by the detector, whether the working tool collies with the person, and stops the robot when determining that the working tool collides with the person. The external force is transmitted from the working tool to the robot arm, and is detected by the detector.

According to a second aspect of the disclosure, in the robot according to the first aspect, at least a part of the surface of the movable part except for the surface of a portion necessary to be exposed to accomplish the purpose of an operation is covered by the shock-absorbing member.

According to a third aspect of the disclosure, the robot according to the first or second aspect further includes a fixing tool for detachably securing the shock-absorbing member to the base part of the working tool. An outermost part of the fixing tool is positioned more inward than an outermost part of the shock-absorbing member which is compressed by receiving a load from the outside.

According to a fourth aspect of the disclosure, in the robot according to any of the first to third aspects, the shock-absorbing member is configured by laminating a plurality of layers having different rigidities.

According to a fifth aspect of the disclosure, in the robot according to any of the first to fourth aspects, at least an outermost peripheral part of the shock-absorbing member includes an elastic body composed of a polymer compound.

According to a sixth aspect of this disclosure, in the robot according to any of the first to fifth aspects, the working tool is a gripping device including at least two fingers as the movable part.

BRIEF DESCRIPTION OF THE DRAWINGS

These objects, features, and advantages of the present invention and other objects, features, and advantages will become further clearer from the detailed description of typical embodiments illustrated in the appended drawings.

FIG. 1 is a view of the configuration of a collaborative robot system including a robot according to an embodiment of the present disclosure.

DETAILED DESCRIPTION

Figure 2A:
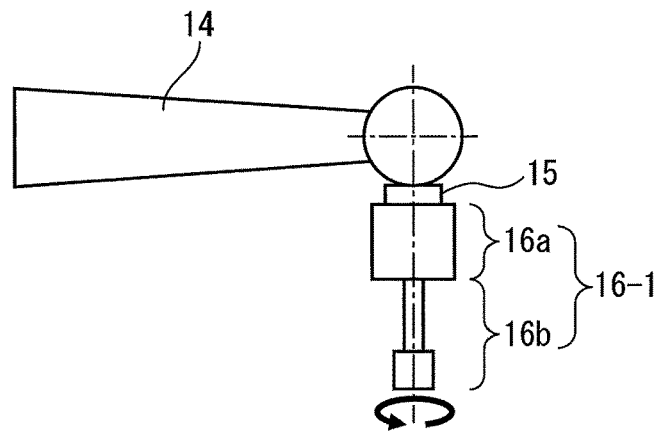
FIG. 2A is a side view schematically illustrating a working tool, which does not have a shock-absorbing member in a first embodiment, and components therearound.

Embodiments of the present invention will be described below with reference to the accompanying drawings. In the following figures, similar members or function parts are designated with the same reference numerals. Components designated with the same reference numeral in the different figures are meant to be components having the same function. These figures are properly modified in scale to assist the understanding thereof.

FIG. 1 is a view of the configuration of a collaborative robot system 1 including a robot 10 according to an embodiment of the present disclosure. In the collaborative robot system 1 shown in FIG. 1, a person 9 and the robot 10 share a work space and perform a cooperation work, and accordingly, are close to each other.

The robot 10 is, for example, a vertical articulated manipulator. A securing plate 11 is secured to a floor L to dispose the robot 10 on the floor L. Further, a force sensor 12 is disposed beneath a robot base 13 of the robot 10, and the robot base 13 of the robot 10 is disposed on the securing plate 11 via the force sensor 12.

A robot wrist flange 15 is provided at the front end of a robot arm 14 in the robot 10. A base part 16a of a working tool 16, such as a gripping hand, is attached to the front end of the robot wrist flange 15.

Further, a shock-absorbing member 17, which absorbs a shock of collision between the working tool 16 and the person 9 or peripheral equipment (not shown), and covers the periphery of at least the base part 16a of the working tool 16 as shown by a dotted line in FIG. 1.

Examples of the constructional material of the working tool 16 include stainless, aluminum alloy, carbon steel, plastic, etc. In order to absorb the shock of collision between the working tool 16 and the person 9 or the peripheral equipment, it is preferable that the shock-absorbing member 17 is made of a material having a rigidity lower than those of the materials of the base part 16a and a movable part 16b of the working tool 16. Further, the outermost peripheral part of the shock-absorbing member 17 may collide with the person 9, and accordingly, it is preferable that at least the outermost peripheral part of the shock-absorbing member 17 is made of a relatively soft material, i.e., an elastic body composed of a polymer compound, such as a foamable resin using synthetic resin including polyurethane, polypropylene, polyethylene, polystyrene, polyacetal, polycarbonate, polyethylene terephthalate, ABS, etc., a synthetic fiber of, for example, nylon, polyester, and acrylic used for clothes, and natural rubber or synthetic rubber including styrene-butadiene rubber, chloroprene rubber, acrylonitrile rubber, silicone rubber, fluorine-containing rubber, urethane rubber, etc.

Suppose that, during the operation of the robot 10, the shock-absorbing member 17 collides with the person 9 performing an operation in its vicinity. The contact force (external force) at this time is input from the base part 16a of the working tool 16 to the force sensor 12 through the robot wrist flange 15, the robot arm 14, and the robot base 13. Note that, in FIG. 1, a gripping hand for gripping or releasing a workpiece W is illustrated as the working tool 16. However, the working tool, which can be applied to the present invention, is not limited to the gripping hand.

The force sensor 12 detects, as described above, an external force to be input via the shock-absorbing member 17. The force sensor 12 includes a distortion detector for detecting a distortion of the force sensor 12 caused by the external force, for example, a distortion gauge, specifically, a semiconductor distortion gauge. More specifically, the force sensor 12 includes a force sensor body, and a distortion gauge bonded to the force sensor body. The force sensor 12 measures the external force and then outputs external force measurement values. Note that the force sensor 12 may be attached to the robot base 13 or another part of the robot 10, for example, a joint part of the robot arm 14.

As shown in FIG. 1, a person detection unit 18 for detecting the person 9 is disposed in the vicinity of the robot 10. The person detection unit 18 is an area sensor, and forms a two-dimensional detection area 19. The person detection unit 18 confirms whether at least the person 9 enters the detection area 19. The person detection unit 18 is connected to a robot control device 20.

Further, the robot 10 is connected to the robot control device 20. The robot control device 20 is a digital computer, and controls the operation of the robot 10.

With reference to FIG. 1, the robot control device 20 includes an external force measurement value state monitoring unit 21 for monitoring external force measurement values output from the force sensor 12, a force detection value calculation unit 22 for calculating a force detection value by subtracting a predetermined correction value from each external force measurement value output from the force sensor 12, and a force detection value state monitoring unit 23 for always monitoring force detection values output from the force detection value calculation unit 22.

The robot control device 20 determines whether the working tool 16 collides with the person 9 or peripheral equipment, based on the information of the external force detected by the force sensor 12. Further, the robot control device 20 is adapted to stop the robot 10 when determining that the working tool 16 collides with the person 9 or peripheral equipment.

More specifically, the robot control device 20 includes, as shown in FIG. 1, a robot motion control unit 24 and a motor-in-robot control unit 25.

The robot motion control unit 24 operates the robot 10 while always comparing the operation condition (for example, halt condition, acceleration condition, deceleration condition, constant-speed condition, etc.) of the robot 10 with the variation state of the force detection value detected by the force detection value state monitoring unit 23. When a result of the comparison satisfies predetermined conditions, the robot motion control unit 24 determines that the robot 10 has collide with the person 9 or peripheral equipment, and then outputs an operation stopping command or a deceleration command to the motor-in-robot control unit 25, to stop or decelerate the robot 10.

The motor-in-robot control unit 25 controls a motor (not shown) in each axis of the robot 10 in response to the command from the robot motion control unit 24. Further, an output unit 29 connected to the robot control device 20 outputs an alarm when needed.

Further, as shown in FIG. 1, the force detection value state monitoring unit 23 has a correction value update unit 31, a force detection value storage unit 32, an update allowing unit 33, a robot stopping unit 34, and a force detection value threshold changing unit 35.

The correction value update unit 31 updates the force detection value, at which the predetermined conditions are satisfied, as a correction value to be used when the force detection value calculation unit 22 calculates a force detection value. The update process of correction values by the correction value update unit 31 can be regarded as resetting of the force sensor 12.

The force detection value storage unit 32 stores force detection values at which the predetermined conditions are satisfied. Note that, when the predetermined conditions are satisfied, the force detection value storage unit 32 may successively store force detection values every time the force detection value calculation unit 22 calculates a force detection value.

The update allowing unit 33 allows, when the person detection unit 18 detects the fact that there is no person 9 in the vicinity of the robot 10, the correction value update unit 31 to update the correction value.

The robot stopping unit 34 determines, when the force detection value detected by the correction value update unit 31 exceeds the threshold value for stopping, that the robot 10 collides with the person 9 or peripheral equipment (not shown), and then decelerates and stops the robot 10. Note that the robot stopping unit 34 may be included in the robot motion control unit 24 of the robot control device 20.

The force detection value threshold changing unit 35 changes the threshold value for a force detection value depending on the time elapsed after the correction value update unit 31 updates the correction value. During, for example, a predetermined time after the operation of the robot 10 starts, the force detection value is unstable in some cases. In this instance, the threshold value for a force detection value is set at a first value, and is changed to a second value after a predetermined time passes.

Further, the external force measurement value state monitoring unit 21 of the robot control device 20 includes a failure detection unit 36. The failure detection unit 36 monitors whether the distortion amount detected by the distortion detector included in the force sensor 12 remains within a predetermined appropriate range, and determines, when the distortion amount does not remain within the appropriate range, that the force sensor 12 breaks down or an abnormal distortion amount is detected.

When the failure detection unit 36 determines a failure or abnormality, the robot control device 20 immediately stop the robot 10, and the output unit 29 connected to the robot control device 20 outputs an alarm. As an alarm, light, sound, voice, etc. can be used independently, or combinations thereof can be used.

Regarding the working tool 16 attached to the wrist at the front end of the robot arm 14, and the shock-absorbing member 17 covering the tool 16, several embodiments will be described below. In each embodiment below, components similar to those shown in FIG. 1 are designated with the same reference numerals, and different points therebetween will be mainly described.

Figure 2B:
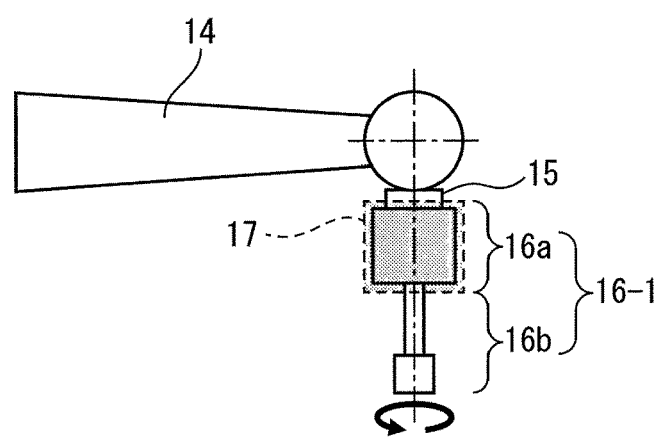
FIG. 2B is a side view schematically illustrating a working tool, which has a shock-absorbing member in the first embodiment, and components therearound.

FIG. 2A is a side view schematically illustrating the working tool 16, which does not have the shock-absorbing member 17 in the first embodiment, and components therearound. FIG. 2B is a side view schematically illustrating the working tool 16 having the shock-absorbing member 17 in the first embodiment, and components therearound.

The working tool 16 in the first embodiment is a burring rotary grinder 16-1. The burring rotary grinder 16-1 has, as shown in FIG. 2A, the base part 16a attached to the front end of the robot wrist flange 15 in the robot arm 14, and the movable part 16b which rotates with respect to the base part 16a. The robot arm 14 is moved, and the movable part 16b (rotary grindstone) of the burring rotary grinder 16-1, which is rotating, is pressed against a portion of a workpiece, so that burrs in the portion are removed.

In the first embodiment, as shown in FIG. 2B, the shock-absorbing member 17 covers the periphery of the base part 16a, i.e., the burring rotary grinder 16-1 other than the movable part 16b (rotary grindstone). This causes, when the burring rotary grinder 16-1 other than the movable part 16b collides with the person 9, the contact force to be relieved, and accordingly, can reduce a dangerous risk in which the burring rotary grinder 16-1 may injure the person 9.

Figure 3A:
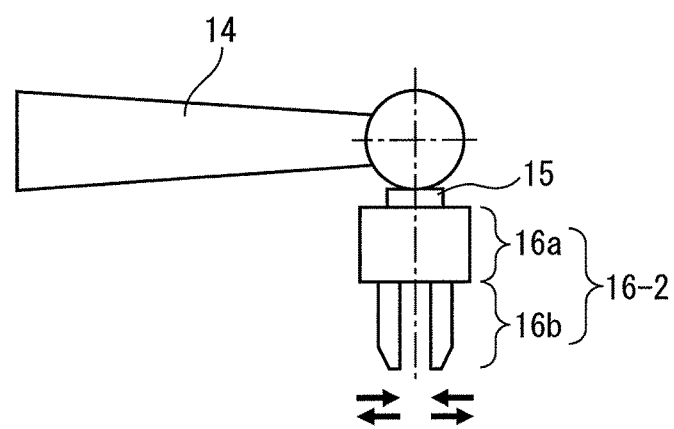
FIG. 3A is a side view schematically illustrating a working tool, which does not have a shock-absorbing member in a second embodiment, and components therearound.
Figure 3B:
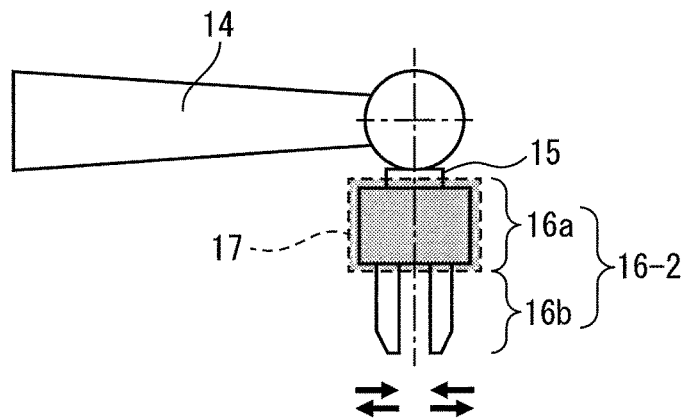
FIG. 3B is a side view schematically illustrating a working tool, which has a shock-absorbing member in the second embodiment, and components therearound.

FIG. 3A is a side view schematically illustrating the working tool 16, which does not have the shock-absorbing member 17 in the second embodiment, and components therearound. FIG. 3B is a side view schematically illustrating the working tool 16 having the shock-absorbing member 17 in the second embodiment, and components therearound.

The working tool 16 in the second embodiment is a gripping hand 16-2 which is a gripping device having at least two fingers. The gripping hand 16-2 has, as shown in FIG. 3A, the base part 16a attached to the front end of the robot wrist flange 15 in the robot arm 14, and the movable part 16b functioning as two fingers which are supported by the base part 16a and which move so as to change the distance therebetween. Moving the robot arm 14, to move the movable part 16b (two fingers) of the gripping hand 16-2 with respect to the workpiece W causes the workpiece W to be gripped and released.

In the second embodiment, as shown in FIG. 3B, the shock-absorbing member 17 covers the periphery of the base part 16a, i.e., the burring rotary grinder 16-2 other than the movable part 16b (fingers). This causes, when the burring rotary grinder 16-2 other than the movable part 16b (fingers) collides with the person 9, the contact force to be relieved, and accordingly, can reduce a dangerous risk in which the burring rotary grinder 16-2 may injure the person 9. In other words, in the gripping hand 16-2 (also referred to as gripper) corresponding to a human hand, a dangerous risk at the time of collision with a person can be reduced.

In the first embodiment and the second embodiment, only the base part 16a of the working tool 16, such as the burring rotary grinder 16-1 or the gripping hand 16-2, is covered by the shock-absorbing member 17. However, in the invention of this application, the part covered by the shock-absorbing member 17 is not limited to only the base part 16a of the working tool 16. As long as the working tool 16 accomplish the purpose of an operation, another shock-absorbing member 17" may be provided in the movable part 16b of the working tool 16.

Examples of the shock-absorbing member 17", which is provided for at least a part of the surface of the movable part 16b of the working tool 16, other than the surface of a part necessary to expose to accomplish the purpose of an operation, include a third embodiment and a fourth embodiment, which will be described below.

Figure 4:
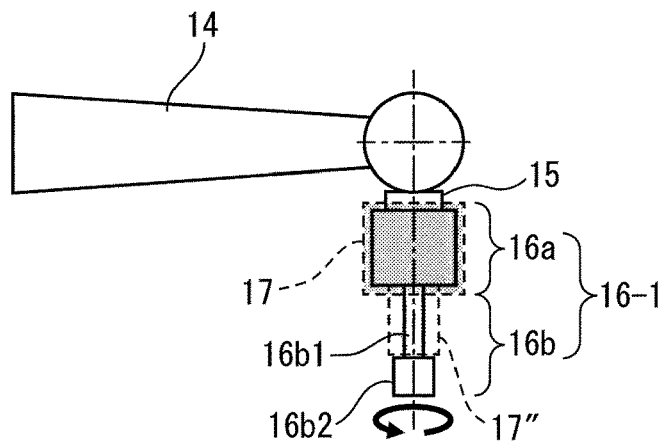
FIG. 4 is a side view schematically illustrating a working tool having a shock-absorbing member in a third embodiment, and components therearound.

FIG. 4 is a side view schematically illustrating the working tool 16 having the shock-absorbing member 17 in the third embodiment, and components therearound.

As can be seen from FIG. 4, the third embodiment indicates an example in which the working tool 16 having the shock-absorbing member 17 is the burring rotary grinder 16-1. The movable part 16b of the burring rotary grinder 16-1 includes a rotary grinder shaft 16b1 and a rotary grinder head 16b2.

In the third embodiment, in addition to the base part 16a of the burring rotary grinder 16-1, the periphery of the rotary grinder shaft 16b1 in the movable part 16b is covered by the shock-absorbing member 17". In other words, it is necessary to expose the rotary grinder head 16b2 to perform a burring operation, and accordingly, only the rotary grinder shaft 16b1 is covered by the shock-absorbing member 17".

As described above, the rotary grinder head 16b2 necessary to perform a burring operation is exposed, the rotary grinder shaft 16b1, which does not have some direct effect on the burring operation, is covered by the shock-absorbing member 17", and the base part 16a is covered by the shock-absorbing member 17. This enables, when the person 9 collides with the burring rotary grinder 16-1, a dangerous risk, in which the person 9 may be injured, to be smaller than that in the first embodiment without reducing the workability of the burring rotary grinder 16-1.

Further, as shown in FIG. 4, it is preferable that the outermost peripheral part of the portion of the shock-absorbing member 17", which covers the rotary grinder shaft 16b1, extends more outward than the outermost peripheral part of the rotary grinder head 16b2. This further reduces a dangerous risk in which the exposed rotary grinder head 16b2 may injure the person 9.

Note that the shock-absorbing member 17" has a shock-absorbing function as in the shock-absorbing member 17. However, the material of the shock-absorbing member 17" may be not identical to that of the shock-absorbing member 17. The shock-absorbing member 17" is a shock-absorbing member of a movable part, and accordingly, may be made of a material softer than the shock-absorbing member 17.

Figure 5:
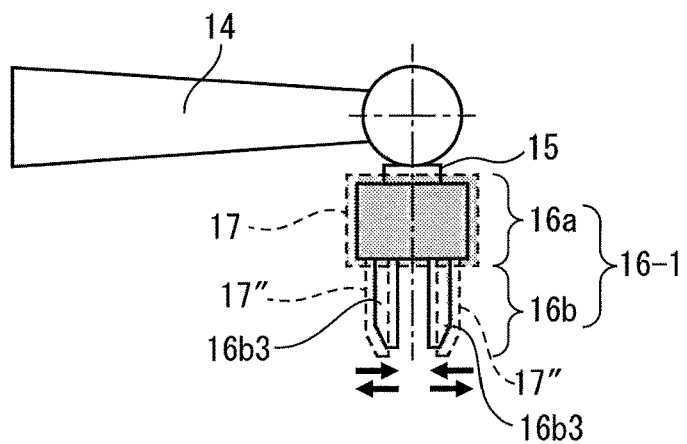
FIG. 5 is a side view schematically illustrating a working tool having a shock-absorbing member in a fourth embodiment, and components therearound.

FIG. 5 is a side view schematically illustrating the working tool 16 having the shock-absorbing member 17 in the fourth embodiment, and components therearound.

As can be seen from FIG. 5, the fourth embodiment indicates an example in which the working tool 16 having the shock-absorbing member 17 is the gripping hand 16-2. The movable part 16b of the gripping hand 16-2 includes two fingers 16b3 rotatably supported by the base part 16a.

In the fourth embodiment, in addition to the base part 16a of the gripping hand 16-2, the outer side of the fingers 16b3 in the movable part 16b is covered by the shock-absorbing member 17". In other words, it is necessary to expose the inner portion of the fingers 16b3, which is to be in contact with the workpiece W, to reliably grip the workpiece W, and accordingly, only the outer side of the fingers 16b3, except for the inner portions to be in contact with the workpiece W, is covered by the shock-absorbing member 17".

As described above, the inner portions of the fingers 16b3 necessary to reliably grip the workpiece W are exposed, the outer portions of the fingers 16b3, which have no direct relation with gripping of the workpiece W, are covered by the shock-absorbing member 17", and the base part 16a is covered by the shock-absorbing member 17. This enables, when the person 9 collides with the gripping hand 16-2, a dangerous risk, in which the person 9 may be injured, to be smaller than that in the second embodiment while reliably ensuring the gripping of the workpiece W.

Note that the configuration of the shock-absorbing member 17 covering at least the base part 16a of the working tool 16 is not limited to those shown in the first to fourth embodiments. Thus, examples of the configuration of the shock-absorbing member 17 include a fifth embodiment and a sixth embodiment, which will be described below.

Figure 6:
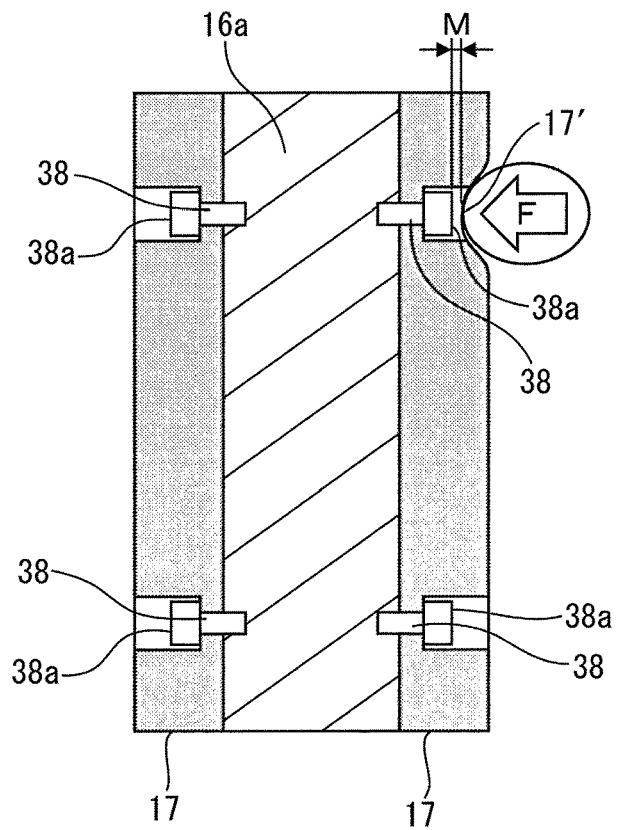
FIG. 6 is a sectional view schematically illustrating a base part of a working tool having a shock-absorbing member in a fifth embodiment.

FIG. 6 is a sectional view schematically illustrating the base part 16a of the working tool 16 having the shock-absorbing member 17 in the fifth embodiment.

In the fifth embodiment, as shown in FIG. 6, fixing tools 38, such as bolts, are used to detachably secure the shock-absorbing member 17 to the base part 16a of the working tool 16. Thus, when the shock-absorbing member 17 deteriorates due to long-term use, or when the shock-absorbing member 17 collides with the peripheral equipment and then is broken, the shock-absorbing member 17 can be easily replaced.

The shock-absorbing member 17 secured by the fixing tools 38 is soft, and accordingly, is recessed by receiving an external force (load) when the shock-absorbing member 17 collides with the person 9. As the external force increases, the recessed amount of the shock-absorbing member 17 increases. As described above in the first embodiment, such an external force is transmitted from the working tool 16, and is detected by the force sensor 12 via the robot arm 14. Further, the robot control device 20 is adapted to stop the robot 10 when determining, based on the information of the external force detected by the force sensor 12, that the working tool 16 collides with the person 9. In this respect, the external force in the case where the robot control device 20 determines that the working tool 16 collides with the person 9 is defined as a determination threshold value F.

When the force sensor 12 detects an external force equal to or greater than the determination threshold value F, the robot 10 stops. However, the external force equal to or greater than the determination threshold value F recesses the surface of the outermost peripheral part of the shock-absorbing member 17, and accordingly, an outermost part 38a (e.g., a bolt head) of each fixing tool 38 may expose from a recessed surface 17'.

In order to avoid this possibility, in the fifth embodiment, as shown in FIG. 6, the outermost part 38a of the fixing tool 38 is positioned more inward than the outermost peripheral part (outermost part) of the shock-absorbing member 17 with respect to the base part 16a of the working tool 16. Further, the outermost part 38a of the fixing tool 38 in this embodiment is positioned further more inward than the surface 17' of the outermost peripheral part of the shock-absorbing member 17 which is compressed by the external force equal to or greater than the determination threshold value F.

In other words, as shown in FIG. 6, when the external force equal to or greater than the determination threshold value F is applied to the shock-absorbing member 17, so that the surface of the outermost peripheral part of the shock-absorbing member 17 is recessed, a predetermined dimensional margin M is maintained between the recessed surface 17' and the outermost part 38a of the fixing tool 38.

This eliminates, when the working tool 16 collides with the person 9 via the shock-absorbing member 17, a risk in which a rigid fixing tool 38, such as a bolt, may directly collide with and injure the person 9.

Figure 7:
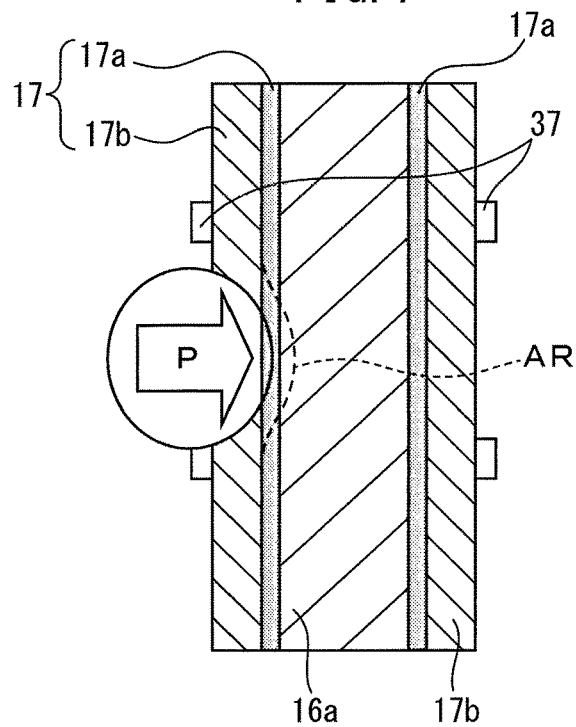
FIG. 7 is a sectional view schematically illustrating a base part of a working tool having a shock-absorbing member in a sixth embodiment.

FIG. 7 is a sectional view schematically illustrating the base part 16a of the working tool 16 having the shock-absorbing member 17 in the sixth embodiment.

As shown in FIG. 7, the shock-absorbing member 17 is configured by laminating two shock-absorbing layers 17a and 17b having different rigidities. More specifically, the outer peripheral surface of the base part 16a of the working tool 16 is covered by the first shock-absorbing layer 17a, and the second shock-absorbing layer 17b having a rigidity higher than that of the first shock-absorbing layer 17a and lower than that of the base part 16a is formed around the first shock-absorbing layer 17a. In other words, the second shock-absorbing layer 17b corresponding to the outermost peripheral part of the shock-absorbing member 17, which may collide with the person 9 or peripheral equipment, is made of a material having a rigidity higher than that of the first shock-absorbing layer 17a and lower than that of the base part 16a. Thus, the outer surface, which applies a function for relieving a shock of collision with the person 9 or peripheral equipment to the shock-absorbing member 17 and which has an abrasion resistance, can be constructed.

Note that the shock-absorbing member 17 may be comprised of three or more shock-absorbing layers having different rigidities. A part of the shock-absorbing member 17 may be comprised of a plurality of shock-absorbing layers. Further, FIG. 7 illustrates that the thickness of the second shock-absorbing layer 17b is larger than that of the first shock-absorbing layer 17a, but the present invention is not limited to this thickness. More specifically, the thickness of shock-absorbing layers constituting the shock-absorbing member 17 is appropriately set so as to relieve a shock of collision between the working tool 16 and the person 9 or peripheral equipment.

The first shock-absorbing layer 17a and the second shock-absorbing layer 17b can be made of, for example, an elastic body composed of a polymer compound, such as a foamable resin using synthetic resin including polyurethane, polypropylene, polyethylene, polystyrene, polyacetal, polycarbonate, polyethylene terephthalate, ABS, etc., a synthetic fiber of, for example, nylon, polyester, and acrylic used for clothes, and natural rubber or synthetic rubber including styrene-butadiene rubber, chloroprene rubber, acrylonitrile rubber, silicone rubber, fluorine-containing rubber, urethane rubber, etc. Further, an inner layer, such as the first shock-absorbing layer 17a, covered by an outermost peripheral part, i.e., the second shock-absorbing layer 17b may be made of a gel-like material. However, in order to improve the abrasion resistance of the outer surface of the shock-absorbing member 17, it is preferable, for the second shock-absorbing layer 17b, to select a material having a rigidity higher than that of the first shock-absorbing layer 17a and lower than that of the base part 16a. Further, the outermost peripheral layer of the shock-absorbing member 17 may be made of genuine leather or a covering material, such as synthetic leather, vinyl, rubber sheet, etc., to improve the abrasion resistance of the outer surface of the shock-absorbing member 17.

The shock-absorbing member 17 is constructed by integrating the first shock-absorbing layer 17a with the second shock-absorbing layer 17b using an adhesive agent or bolts.

The shock-absorbing member 17 shown in FIG. 7 is in close contact with the outer peripheral surface of the base part 16a of the working tool, and is secured thereto by a band 37. The shock-absorbing member 17 can also be secured by other fixing means such as an adhesive agent or bolts. When bolts are used as in the fifth embodiment, the shock-absorbing member 17 can be easily attached and detached.

When the outer peripheral part of the base part 16a of the working tool collides with the person 9 or peripheral equipment, a contact force acts on the shock-absorbing member 17 on the outer peripheral part, and then the shock-absorbing member 17 is crushed. This contact force (external force P) acts on the base part 16a of the working tool in a dotted line area AR shown in FIG. 7. At this time, as described above, the shock-absorbing member 17 is in close contact with and secured to the outer peripheral surface of the base part 16a of the working tool.

Thus, the external force P is immediately transmitted to the base part 16a of the working tool 16, and is input from the base part 16a of the working tool 16 to the force sensor 12 through the robot wrist flange 15, the robot arm 14, and the robot base 13. In other words, the force sensor 12 can sensitively detect the external force P acting on the base part 16a of the working tool 16 via the shock-absorbing member 17. Further, the necessity that the force sensor 12 is disposed in the working tool 16 is eliminated, and accordingly, the wiring of cables to the working tool 16 is simplified.

As described above, in the robot 10 of each embodiment, the periphery of at least the base part 16a of the working tool 16 attached to the robot wrist flange 15 of the front end of the robot arm 14 is covered by the shock-absorbing member 17. This reduces a dangerous risk in which the person 9 may be injured even if the working tool 16 collides with the person 9 when the robot 10 and the person 9 share the work space, to perform a cooperation work.

The working tool 16 attached to the frontmost end of the robot arm 14 moves more quickly than the arm of the robot main body, and accordingly, would probably be the maximum risk source when the robot 10 moves. In the invention of this application, focusing attention on the maximum risk source, i.e., the working tool 16, and providing the shock-absorbing member 17 on the periphery of the working tool 16 reduces a dangerous risk at the time of collision of the working tool 16 with the person 9. Further, in order to enable the working tool 16 to accomplish the purpose of an operation, the shock-absorbing member 17 covers the periphery of at least the base part 16a of the working tool 16. In the collaborative robot which will become increasingly and widely used, the invention of this application improves the most important function, i.e., the human safety, and accordingly, the technical significance of the invention of this application is extremely great. In these points, the invention of this application is essentially different from the technologies disclosed in Japanese Patent No. 5835,276, Japanese Unexamined Patent Publication (Kokai) No. 2014-76524, and Japanese Patent No. 5902664 described in the background art above. As disclosed in, particularly, Japanese Patent No. 5902664, the invention is essentially and greatly different from the technology for covering the robot arm with the protective member.

The present invention has been described above using exemplary embodiments. However, a person skilled in the art would understand that the aforementioned modifications and various other modifications, omissions, and additions can be made without departing from the scope of the present invention. Any appropriate combination of these embodiments is included in the scope of the present invention.

EFFECT OF THE INVENTION

According to the first aspect of this disclosure, a dangerous risk, in which a person may be injured when the working tool attached to the robot arm collides with the person, can be reduced.

Particularly, the working tool attached to the frontmost end of the robot arm moves more quickly than the arm of the robot main body, and accordingly, would probably be the maximum risk source when the robot is in motion. In the first aspect, an effect, in which the maximum risk source, i.e., the dangerous risk in the working tool can be greatly reduced, can be obtained.

This improves the most important function, i.e., the safety in the collaborative robot.

According to the second aspect, it is possible to reduce, to the great extent, the dangerous risk, in which a person may be injured when the movable part of the working tool collides with the person, without avoiding the purpose of an operation of the working tool.

According to the third aspect, when the shock-absorbing member deteriorates due to long-term use, or when the shock-absorbing member collides with the peripheral equipment and then is broken, the shock-absorbing member 17 can be easily replaced. Further, in the third aspect, even when the surface of the outermost peripheral part of the shock-absorbing member is recessed by receiving an external force, the end of the fixing tool for securing the shock-absorbing member to the base part of the working tool, which is opposite to the base part, is always retracted from the surface of the outermost peripheral part of the shock-absorbing member. This reduces the dangerous risk in which the person may be injured by the fixing tool.

According to the fourth aspect, one of layers constituting the shock-absorbing member, which corresponds to the outermost peripheral part that may collides with the person or peripheral equipment, can be made of a material having a rigidity higher than that of the inner side of this layer and lower than that of the base part or movable part of the working tool. Thus, the outer surface, which applies a function for relieving a shock of collision with the person or peripheral equipment to the shock-absorbing member and which has an abrasion resistance, can be constructed.

According to the fifth aspect, the outermost peripheral part of the shock-absorbing member, which may collide with the person, is made of a relatively soft material, such as an elastic body composed of a polymer compound, and accordingly, the dangerous risk in which the person may be injured when the working tool collides with the person can be further reduced. Examples of the polymer compound include a foamable resin using a synthetic resin (plastic) including polyurethane, polypropylene, polyethylene, polystyrene, polyacetal, polycarbonate, polyethylene terephthalate, ABS, etc., a synthetic fiber of, for example, nylon, polyester, and acrylic used for clothes, and natural rubber or synthetic rubber including styrene-butadiene rubber, chloroprene rubber, acrylonitrile rubber, silicone rubber, fluorine-containing rubber, urethane rubber, etc. Of course, the polymer compound does not always have to be foam.

What is claimed is:

1. A robot that shares a work space with a person, to perform an operation, wherein the robot includes a robot arm to which a working tool is attached, the working tool having a base part and a movable part provided in the base part, the robot comprising:
    a shock-absorbing member which covers the periphery of at least the base part of the working tool and which is made of a material having a rigidity lower than that of the base part and the movable part of the working tool;
    a detector which is provided for the robot arm, to detect an external force input on the working tool via the shock-absorbing member; and
    a robot control device which determines, based on information of the external force detected by the detector, whether the working tool collides with the person, and stops the robot when determining that the working tool collides with the person,
    wherein
    the external force input on the working tool is transmitted via the shock-absorbing absorbing member to the base part of the working tool and then transmitted to the robot arm, and then is detected by the detector.

2. The robot according to claim 1, wherein at least a part of the surface of the movable part except for the surface of a portion necessary to be exposed to accomplish the purpose of an operation is covered by the shock-absorbing member.

3. The robot according to claim 2, further comprising a fixing tool for detachably securing the shock-absorbing member to the base part of the working tool, wherein
    an outermost part of the fixing tool is positioned more inward than an outermost part of the shock-absorbing member which is compressed by receiving a load from the outside.

4. The robot according to claim 1, wherein the shock-absorbing member is configured by laminating a plurality of layers having different rigidities.

5. The robot according to claim 1, wherein at least an outermost peripheral part of the shock-absorbing member includes an elastic body composed of a polymer compound.

6. The robot according to claim 1, wherein the working tool is a gripping device comprising at least two fingers as the movable part.

* * * * *